(12) United States Patent
Sankaran et al.

(10) Patent No.: US 9,078,224 B2
(45) Date of Patent: Jul. 7, 2015

(54) DOWNLINK POWER CONTROL USING RELATIVE LOAD

(71) Applicant: Nokia Siemens Networks Oy, Espoo (FI)

(72) Inventors: Chandrasekar Sankaran, Arlington Heights, IL (US); Philip Fleming, Glen Ellyn, IL (US); Eugene Visotsky, Buffalo Grove, IL (US); Michael Honig, Evanson, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 160 days.

(21) Appl. No.: 13/733,220

(22) Filed: Jan. 3, 2013

(65) Prior Publication Data

US 2014/0187282 A1    Jul. 3, 2014

(51) Int. Cl.
*H04W 52/08* (2009.01)
*H04W 52/34* (2009.01)
*H04W 24/10* (2009.01)

(52) U.S. Cl.
CPC ............ *H04W 52/343* (2013.01); *H04W 24/10* (2013.01)

(58) Field of Classification Search
CPC ... H02P 7/0044; H04W 24/10; H04W 52/343
USPC ........................................................ 455/522
See application file for complete search history.

(56) References Cited

U.S. PATENT DOCUMENTS

| | | | | |
|---|---|---|---|---|
| 8,244,292 B2 * | 8/2012 | Roh et al. | | 455/522 |
| 8,385,939 B2 * | 2/2013 | Liao et al. | | 455/453 |
| 8,582,683 B2 * | 11/2013 | Sahara | | 375/295 |
| 8,626,227 B2 * | 1/2014 | Zhu et al. | | 455/522 |
| 2008/0188260 A1 | 8/2008 | Xiao et al. | | 455/522 |
| 2009/0296574 A1 | 12/2009 | Liao et al. | | 370/230 |
| 2012/0122512 A1 | 5/2012 | Nammi et al. | | 455/522 |
| 2012/0270593 A1 | 10/2012 | Park et al. | | 455/522 |

FOREIGN PATENT DOCUMENTS

GB    2360909 A    10/2001

OTHER PUBLICATIONS

Ahmed, Furgan, et al., "Distributed Algorithm for Downlink Resource Allocation in Multicarrier Small Cell Networks",, Proc. ICC, Jun. 2012, 7 pgs.
Shi, Changxin et al., "Uplink Distributed Power and Receiver Optimization Across Multiple Cells", IEEE 2012, pp. 1608-1612.
Liu, Peijuan, et al., "Single-Cell Forward Link Power Allocation Using Pricing in Wireless Networks", IEEE 2004, pp. 533-543.

(Continued)

*Primary Examiner* — Bobbak Safaipour
(74) *Attorney, Agent, or Firm* — Harrington & Smith

(57) ABSTRACT

The specification and drawings present a new method, apparatus and software related product (e.g., a computer readable memory) for a power control (e.g., at least for DL power control) in a cell using a concept of a relative load in a network such as a wireless network. The relative load may be a ratio of cell's own load relative to an average load in a cluster of neighboring cells for scaling a nominal power value (or a function of the power value). The load can be measured, for example, either as a number of UEs in the cell, a RB utilization in the cell, a DL information traffic in the cell, or any other metric that's representative of the load in the cell. The resulting computed power for a DL signaling can be either on a per cell basis or on a per UE basis.

18 Claims, 5 Drawing Sheets

(56) References Cited

OTHER PUBLICATIONS

Zhou, Chi, et al., "Two-Cell Power Allocation for Downlink CDMA", IEEE 2004, pp. 2256-2266.
Boussif, Malek, et al., "Load Adaptive Power Control in LTE Uplink", IEEE 2010, pp. 288-292.
Mach, Pavel, et al., "Dynamic Power Control Mechanism for Ferntocells Based on the Frame Utilization", IEEE, 2010, pp. 498-503.
3GPP TR 36.814 V9.0.0 (Mar. 2010); 3rd Generation Partnership Project; Technical Specification Group Radio Access Network; Evolved Universal Terrestrial Radio Access (E-UTRA); Further advancements for E-UTRA physical layer aspects (Release 9) (104 pages).

* cited by examiner

DOWNLINK POWER CONTROL USING RELATIVE LOAD

TECHNICAL FIELD

The exemplary and non-limiting embodiments of this invention relate generally to wireless communications and more specifically to a downlink power control in a cell using a concept of a relative load.

BACKGROUND ART

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BW bandwidth
CINR carrier to interference and noise ratio
CQI channel quality indicator
CRS common reference signal
DL downlink
E-UTRA evolved universal terrestrial radio access
eNB or eNodeB evolved node B/base station in an E-UTRAN system
E-UTRAN evolved UTRAN (LTE)
FFR fractional frequency reuse
FSS frequency selective scheduler
FTP file transfer protocol
HARQ hybrid automatic repeat request
ICIC inter cell interference co-ordination
LTE long term evolution
LTE-A long term evolution advanced
MIMO multiple input multiple output
MMSE minimum MSE
MRC maximum ratio combining
MSE mean squared error
NGMN next generation mobile networks
PF proportional fair
QAM quadrature amplitude modulation
RAN radio access network
RB resource block
RRC radio resource controller
Rx receiver
RAT radio access technology
SB subband
TU typical urban
Tx transmitter
UE user equipment (e.g. mobile terminal)
UL uplink
UTRAN universal terrestrial radio access network
WB wideband
PCN power control normalized
PCLN power control log normalized In LTE, downlink interference control is a major topic of interest and several schemes have been proposed to mitigate interference. These schemes are typically referred to as Fractional Frequency Reuse (FFR)/Inter cell Interference Coordination (ICIC) schemes. They all essentially do some form of downlink power control. In these schemes a cell sets aside a portion of its bandwidth for being transmitted at a low power level (including zero power), so that neighboring cells can schedule their cell edge UEs in these portions to mitigate interference issues. The problem with these approaches is that they are ad-hoc static approaches where there is no information sharing between the cells that could potentially lead to better utilization of system resources (and/or optimization of a global utility metric).

SUMMARY

According to a first embodiment, a method, comprising: determining, by an access node supporting a cell in a network, a scaling factor for a load of the cell relative to an average load per cell of a cluster of cells comprising the cell and a group of neighboring cells; and calculating by the access node an optimized transmit power at least in downlink in the cell using the determined scaling factor.

According to a second embodiment, an apparatus comprising: at least one processor and a memory storing a set of computer instructions, in which the processor and the memory storing the computer instructions are configured to cause the apparatus, supporting a cell in a network, to: determine a scaling factor for a load of the cell relative to an average load per cell of a cluster of cells comprising the cell and a group of neighboring cells; and calculate by the access node an optimized transmit power at least in downlink in the cell using the determined scaling factor.

According to a third embodiment, a computer program product comprising a non-transitory computer readable medium bearing computer program code embodied herein for use with a computer, the computer program code comprising: code for determining, by an access node supporting a cell in a network, a scaling factor for a load of the cell relative to an average load per cell of a cluster of cells comprising the cell and a group of neighboring cells; and code for calculating by the access node an optimized transmit power at least in downlink in the cell using the determined scaling factor.

BRIEF DESCRIPTION OF THE DRAWINGS

For a better understanding of the nature and objects of the present invention, reference is made to the following detailed description taken in conjunction with the following drawings, in which:

FIG. 2 is a diagram demonstrating simulation results for a $5^{th}$ percentile throughput gain as a function of a number of UEs per cell for a bursty traffic model according to exemplary embodiments of the;

DETAILED DESCRIPTION

Figure 1:
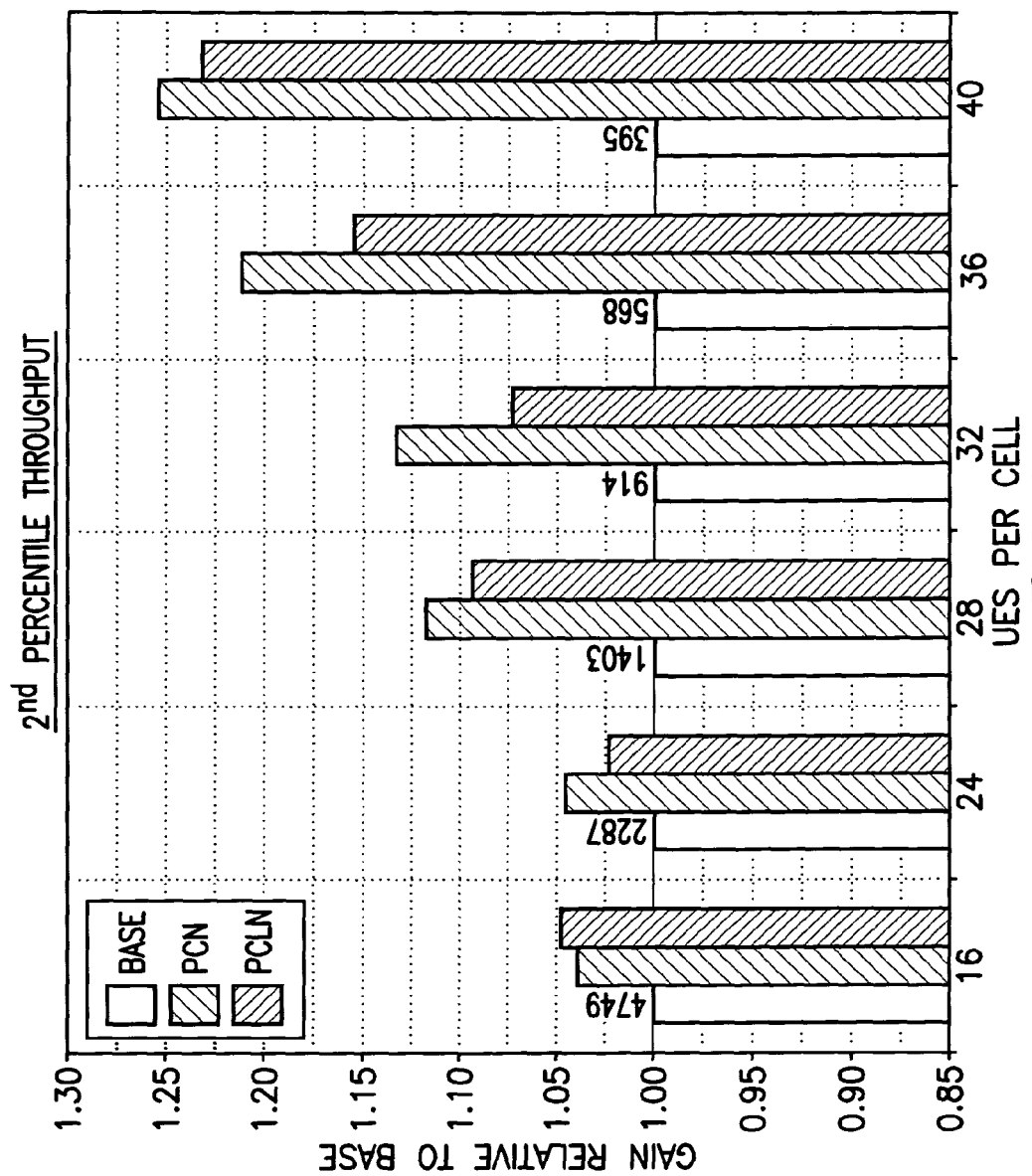
FIG. 1 is a diagram demonstrating simulation results for a $2^{nd}$ percentile throughput gain as a function of number of UEs per cell for a bursty traffic model according to exemplary embodiments of the invention.

A new method, apparatus, and software related product (e.g., a computer readable memory) are presented for a power control (e.g., at least for DL power control) in a cell using a concept of a relative load in a network such as a wireless network to scale a nominal power value (or a function of the power value, e.g., log(power)). The relative load may be a ratio of cell's own load relative to an average load in a cluster of neighboring cells. The load can be measured, for example, either as a number of UEs in the cell, a RB utilization in the cell, a DL information traffic in the cell, or any other metric that is representative of a cell load. The resulting computed power for a DL signaling can be either on a per cell basis or on a per UE basis. The described approach may result in a heavily loaded cell using more power than a lightly loaded neighboring cell. The lightly loaded neighbor thus may cause lower interference to UEs in the heavily loaded cell. Though the UEs in the lightly loaded cell may see higher interference/lower CINR, it can be compensated by the fact that each of these UEs may have access to more bandwidth.

It is noted that for the purposes of this invention, the cluster of neighboring cells may be defined as a group of neighboring cells physically/geographically sharing a border with a cell in the cluster. However, in a broader sense the cluster may be defined as an extended group of neighboring cells not only physically sharing the border with that cell but also those cells which may not geographically share the border with the cell but cause a measurable power interference with UEs in the cell.

According to an embodiment of the invention, an access node/network element (e.g., eNB) supporting a cell, in a network such as wireless LTE network, may determine a scaling factor using the load of the cell relative to an average load per cell of a cluster of cells comprising the cell and a group of neighboring cells of the cell. Then, using the determined scaling factor, the access node may calculate a downlink optimized transmit power in the cell using the determined scaling factor. The determining of the scaling factor and calculating of the downlink optimized transmit power (for UEs) may be performed by the access node at configurable time intervals.

Moreover, the optimized transmit power (or a function of the power, e.g., log( )) may be equal to a nominal power (or a function of the nominal power, e.g., log( )) multiplied by the scaling factor. The nominal power may be a configurable quantity or a system parameter. In one scenario, the scaling factor may be determined as a ratio of the average number of UEs in the cell and the average number of UEs in the cluster of cells. In another scenario, the scaling factor may be determined as a ratio of the average number of resource blocks used for communication in the cell and the average number of resource blocks used for communication in the cluster of cells. In yet another scenario, the scaling factor may be determined as a ratio of an average volume of DL information traffic used in the cell and the average volume of DL information traffic in the cluster of cells.

In a further embodiment, the optimized transmit power may be the result of solving a global utility optimization problem of the form:

$$\text{Maximize} \sum_{i=1}^{M_S} \sum_{u=1}^{N_i} \log(T_u) \Leftrightarrow \text{Maximize} \sum_{i=1}^{M_S} \sum_{u=1}^{N_i} \lambda_{u,i} \frac{SE_u(P_i)}{T_u}.$$

where $M_S$ is a total number of cells in system, $N_i$ is a total number of UEs in cell i, $\lambda_{u,i}$ is a fraction of bandwidth assigned to UE u in cell I, $SE_u(P_i)$ is a spectral efficiency of UE u when cell i transmits at $P_i$ and $T_u$ is a throughput of the UE u. The above maximization problem can be decomposed in each cell (i) as:

$$\max_{0 \leq P_i \leq P_{max}, \lambda_{u,i}} U(i) = \left[ \sum_{u=1}^{N_i} \lambda_{u,i} \times \frac{SE_u(P_i)}{T_u} + \underbrace{\sum_{k \neq i}^{M_S} \sum_{v=1}^{N_k} \lambda_{v,k} \times \frac{SE_v(P_i)}{T_v}}_{\text{other sectors utility}} \right]. \quad (1)$$

Cell i then can determine the optimal power $P_i$ by solving:

$$\frac{\partial}{\partial P_i} U(i) = 0. \quad (2)$$

The other sectors utility in the above Equation 1 represents a penalty term and reflects the effect of interference in neighboring cells due to cell i transmitting at power $P_i$. This penalty term can be represented as: $P_i*K/F$, where K is a constant and F is the scaling factor determined as the ratio of average load in cell i to the average load in the cluster of cells—thus a heavily loaded cell will pay a lower penalty compared to a lightly loaded cell (and hence won't power down as much as the lightly loaded cell). Using this representation for the penalty term and solving equation (2) will lead to an optimal transmit power per cell per UE of the form:

$$P_{i,u}^* = -\left( \frac{r_u \times \overline{CQI_u} + \left(\frac{K}{F}\right) T_u}{T_u \times \left(\frac{K}{F}\right) \overline{CQI_u}} \right), \quad (3)$$

where $r_u$ is a MIMO rank of a UE u, $CQI_u$ is a CQI for the UE u associated with the rank $r_u$, $\overline{CQI_u}$ is a CQI associated with the rank $r_u$ if the cell i was to use a unit power (i.e., $P_i=1$)

According to one embodiment, the DL optimized transmit power per cell (the same power may be used for all UEs in the cell) can be calculated as follows:

$$P_i = P_{nom} \times F \quad (4),$$

where F is a scaling factor and $P_{nom}$ is a nominal power, a configured quantity or a system parameter (e.g., $P_{nom}$ can be set based on cell coverage requirements). For example, as described herein the scaling factor F can be determined as a ratio:

$$F = N_i/N_{ave} \quad (5),$$

where $N_i$ is the average number of UEs per cell i and $N_{ave}$ is an average number of UEs (or active UEs) per cell in a cluster of cells which comprises the cell i and its neighboring cells. The cluster may comprise a group of local neighbor cells (e.g., 6 neighboring cells). $N_{ave}$ can be obtained by the eNB of the one cell from a Radio Resource Controller (RRC) or by exchange of load information among neighboring cells through the X2 interface. Alternatively, as described herein, the scaling factor F may be determined as a similar ratio for RB utilization in the cell vs. the cluster of neighboring cells, or for a DL information traffic in the cell vs. the cluster of neighboring cells.

The power terms in Equation (4) can be replaced with a function of the power terms (preferably monotonic), e.g., as follows:

$$\log[P_i] = \log[P_{nom}] \times F \quad (6).$$

Figure 2:
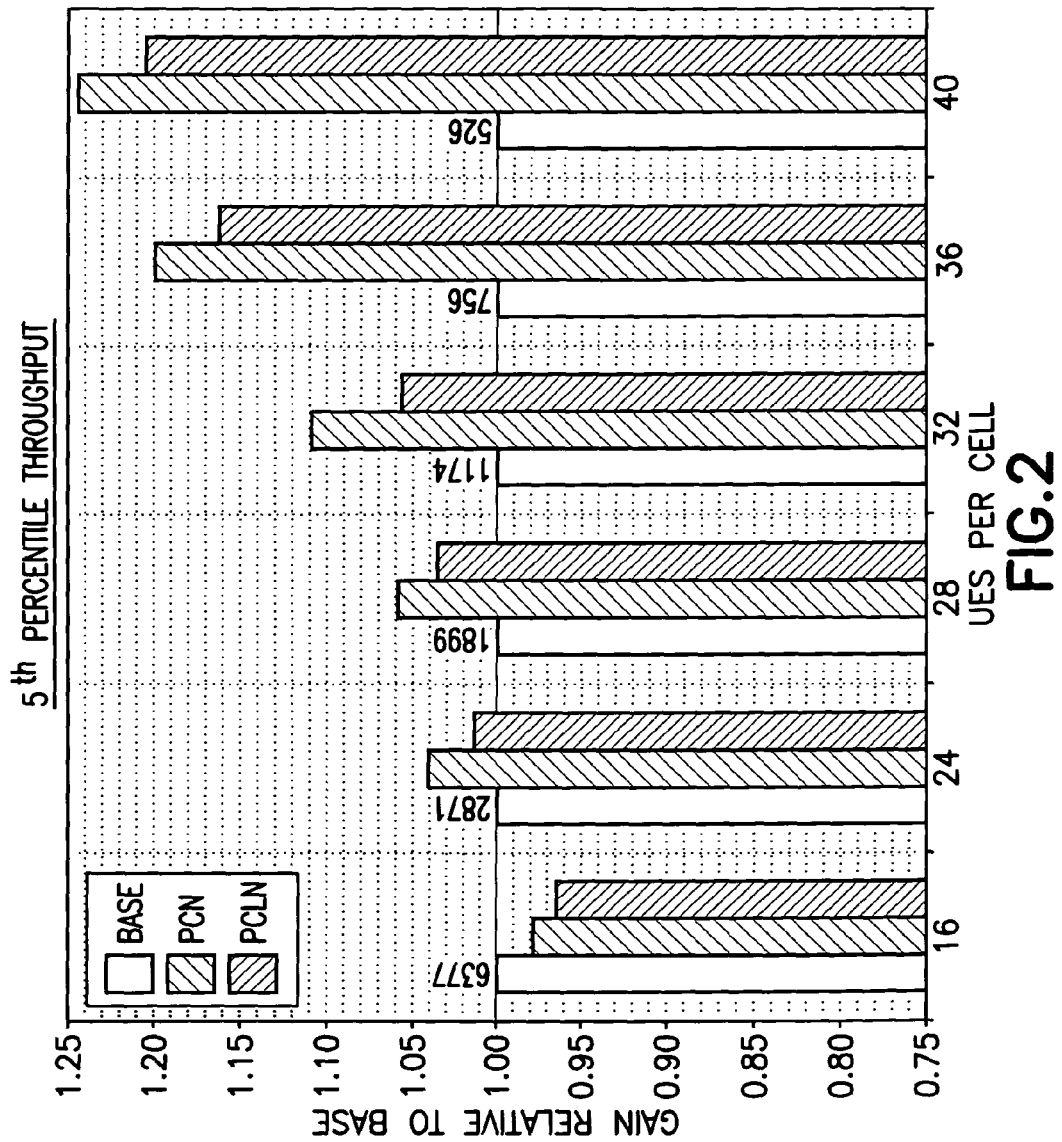
Figure 3:
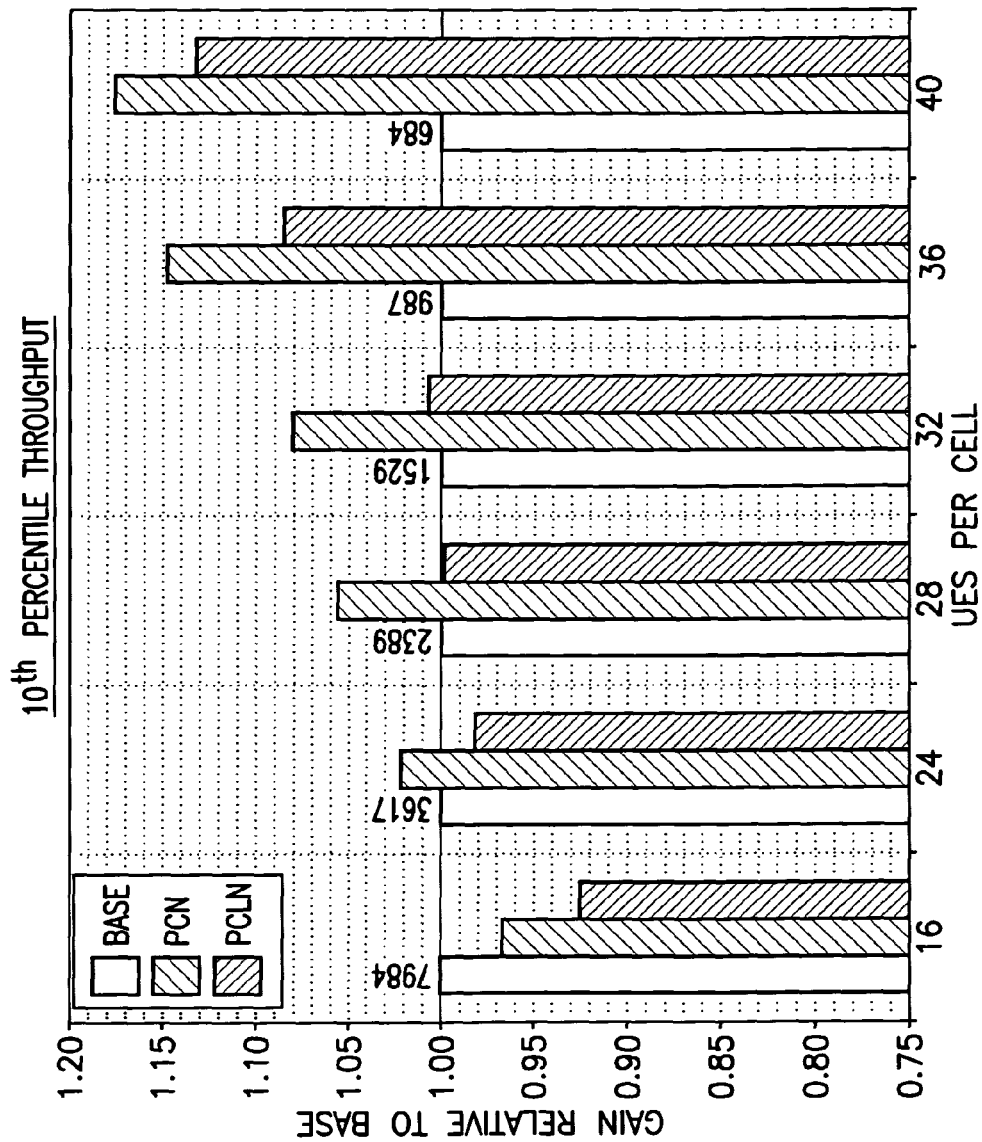
FIG. 3 is a diagram demonstrating simulation results for a $10^{th}$ percentile throughput gain as a function of number of UEs per cell for a bursty traffic model according to exemplary embodiments of the invention.

FIGS. 1-3 demonstrate simulation results for DL power mitigation/control according to exempalary embodiments of the invention under the following simulation assumptions:

Simulation configuration: NGMN case 1 (500 m site-site, 40 W total power);
Channel model and speed: TU6, 3 km/hr;
Uncorrelated antennas: 2 Tx/2 Rx, 2D antenna pattern;
Transmit scheme: TM4;
Bandwidth: 10 MHz FDD (11 data symbols per DL subframe);
Traffic models: Bursty (3GPP TR 36.814: FTP traffic mode-1);
Simulation setup (wraparound): 19 sites, 57 cells, UEs are dropped randomly in simulation space, 12 drops;
Proportional fair (PF) scheduler with frequency selective scheduler (FSS)—assign RB to UE that maximizes PF metric for RB using:
  periodic mode 2-2 (best-M reporting),
  wideband (WB) CQI for non-reported SBs,
  when UE switches rank, get CQI report (corresponding to new rank) for all SBs;
Receiver: MRC/MMSE;
Link adaptation with 20% target error rate on $1^{st}$ HARQ attempt;
CQI feedback period is 10 msec;

FIG. 1 shows simulation results for a $2^{nd}$ percentile throughput gain (compared to a baseline that does not do power control) as a function of number of UEs per cell for one embodiment using PCLN (which uses the log function of the power terms, e.g., based on a normalized version of Equation 6), and PCN (which does not use any function of the power terms, e.g., based on a normalized version of Equation 4).

FIGS. 2 and 3 show simulation results for a $5^{th}$ and $10^{th}$ percentile throughput gains (compared to a baseline that does not do power control) as a function of number of UEs per cell for the proposed approaches PCLN.

It is seen from FIG. 1-3 that the proposed scheme makes performance very robust and provide a significant improvement (25+% in some cases) over conventional techniques (identified as BASE in the figures) which do not use the relative load based power control schemes, as described herein.

Figure 4:
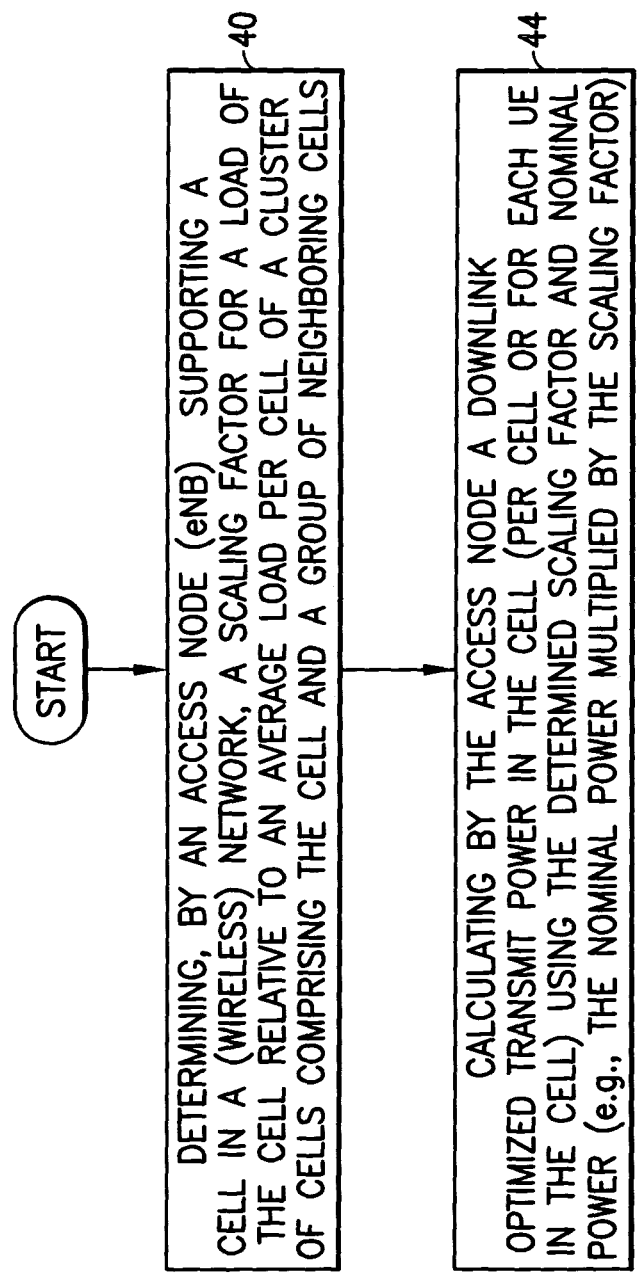
FIG. 4 is a flow chart demonstrating implementation of exemplary embodiments of the invention by an eNB (access node)

FIG. 4 shows an exemplary flow chart demonstrating implementation of embodiments of the invention by an access node (e.g., eNB). It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 4, in a first step 40, the eNB (access node) supporting a cell in a (wireless) network, determines a scaling factor for a load of the cell relative to an average load per cell of a cluster of cells comprising the cell and a group of neighboring cells (which can be obtained from the RRC or through exchange of information between cells over the X2 interface).

In a next step 42, the eNB calculates a downlink optimized transmit power (or a function of the power such as log function of power) in the cell (per cell or for each UE in the cell as described herein) using the determined scaling factor and the nominal power (e.g., the nominal power (or a function of the nominal power) is multiplied by the scaling factor).

Figure 5:
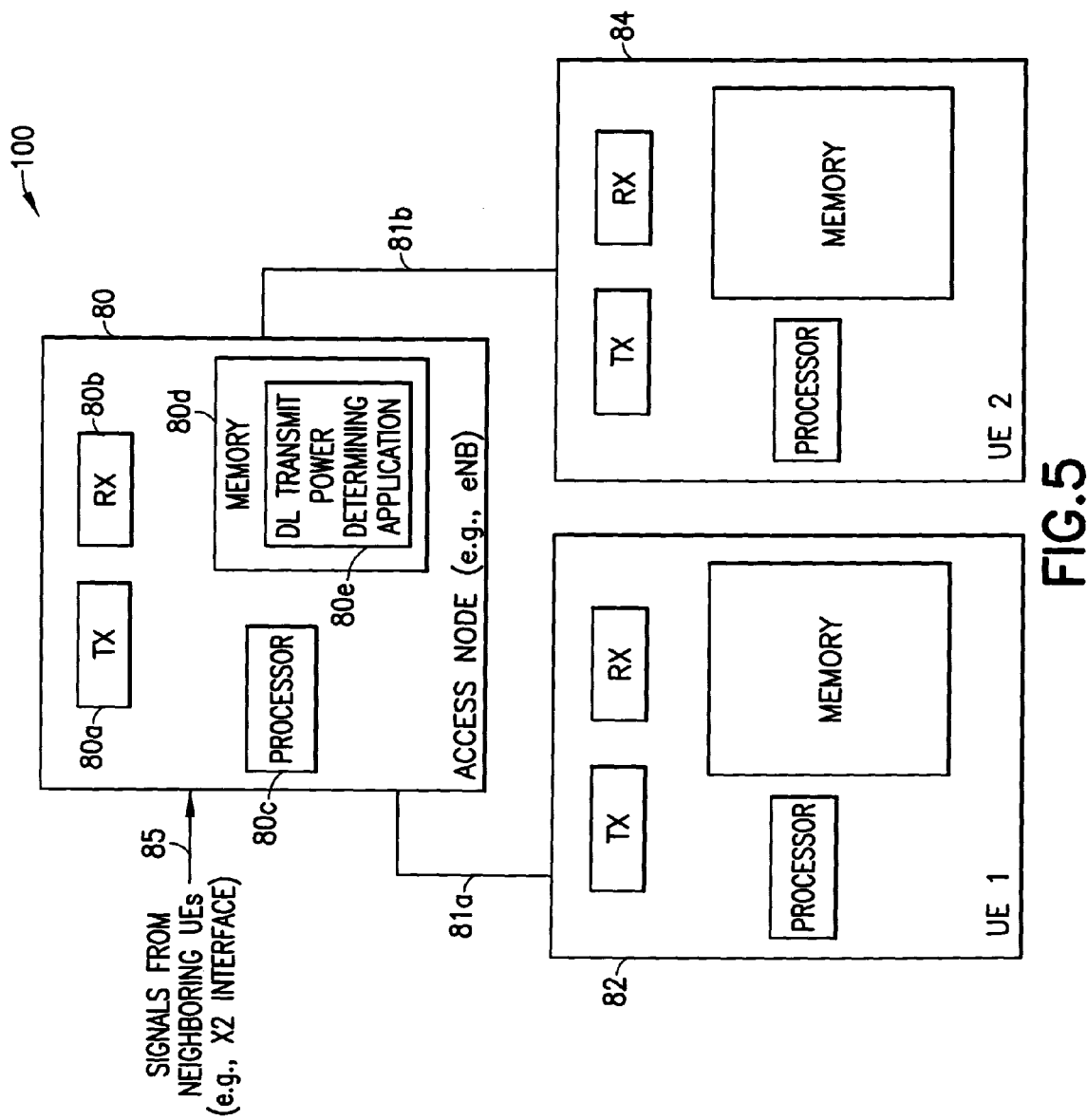
FIG. 5 is a block diagram of wireless devices for practicing exemplary embodiments of the invention.

FIG. 5 shows an example of a block diagram demonstrating LTE devices including an access node (e.g., eNB) 80 comprised in a network 100, and UEs 82 and 84 communicating with the eNB 80, according to an embodiment of the invention. FIG. 5 is a simplified block diagram of various electronic devices that are suitable for practicing the exemplary embodiments of this invention, and a specific manner in which components of an electronic device are configured to cause that electronic device to operate.

The eNB 80 may comprise, e.g., at least one transmitter 80*a* at least one receiver 80*b*, at least one processor 80*c* at least one memory 80*d* and a DL transmit power determining application module 80*e*. The transmitter 80*a* and the receiver 80*b* may be configured to provide a wireless communication with the UEs 82 and 84 (and others not shown in FIG. 5), e.g., through corresponding links 81*a* and 81*b* (e.g., to sent DL signals using determined power according to the embodiments described herein). Also the device 80 can communicate using a wireless or wired link 85 with other neighboring cells (e.g., through a wired X2 interface) as described herein. The transmitter 80*a* and the receiver 80*b* may be generally means for transmitting/receiving and may be implemented as a transceiver, or a structural equivalence thereof. It is further noted that the same requirements and considerations are applied to transmitters and receivers of the UEs 82 and 84.

Various embodiments of the at least one memory 80*d* (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80*c* include but are not limited to general purpose computers, special purpose computers, microprocessors, digital signal processors (DSPs) and multi-core processors. Similar embodiments are applicable to memories and processors in other devices 82 and 84 shown in FIG. 5.

The a DL transmit power determining application module 80*e* may provide various instructions for performing steps 40-44 shown in FIG. 4. The module 80*e* may be implemented as an application computer program stored in the memory 80*d*, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80*e* may be implemented as a separate block or may be combined with any other module/block of the device 80, or it may be split into several blocks according to their functionality.

The devices 82 and 84 may have similar components as the eNB 80, as shown in FIG. 5, so that the above discussion about components of the eNB 80 is fully applicable to the components of the UEs 82 and 84.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this, invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
   determining, by an access node supporting a cell in a network, a scaling factor for a load of the cell relative to an average load per cell of a cluster of cells comprising the cell and a group of neighboring cells; and
   calculating by the access node an optimized transmit power at least in downlink in the cell using the determined scaling factor, wherein the optimized transmit power equals a nominal power or a function of the nominal power multiplied by the scaling factor.

2. The method of claim 1, wherein the network is a wireless network.

3. The method of claim 1, wherein determining of the scaling factor and calculating of the downlink optimized transmit power is performed by the access node at configurable time intervals.

4. The method of claim 1, wherein the access node is an eNB.

5. The method of claim 1, wherein the scaling factor is determined as a ratio of an average number of user equipments in the cell and the average number of user equipments in the cluster of cells.

6. The method of claim 1, wherein the scaling factor is determined as a ratio of an average number of resource blocks used for communication in the cell and the number of resource blocks used for communication in the cluster of cells.

7. The method of claim 1, wherein the scaling factor is determined as a ratio of an average volume of a downlink information traffic used in the cell and the average volume of a downlink information traffic in the cluster of cells.

8. The method of claim 1, wherein a function of the optimized transmit power equals the function of the nominal power multiplied by the scaling factor.

9. The method of claim 8, wherein the function of the optimized transmit power is a logarithmic function of the optimized transmit power and the function of the nominal power is the logarithmic function of the nominal power.

10. The method of claim 1, wherein a penalty term in a utility maximization problem equals the optimized transmit power multiplied by a constant and divided by a scaling factor.

11. The method of claim 1, wherein the calculated optimized transmit power is different for different user equipments in the cell.

12. An apparatus comprising:
    at least one processor and a memory storing a set of computer instructions, in which the processor and the memory storing the computer instructions are configured to cause the apparatus, supporting a cell in a network, to:
    determine a scaling factor for a load of the cell relative to an average load per cell of a cluster of cells comprising the cell and a group of neighboring cells; and
    calculate by the access node an optimized transmit power at least in downlink in the cell using the determined scaling factor, wherein the optimized transmit power equals a nominal power or a function of the nominal power multiplied by the scaling factor.

13. The apparatus of claim 12, wherein the apparatus comprises an eNB.

14. The apparatus of claim 12, wherein the scaling factor is determined as one of:
    a ratio of an average number of user equipments in the cell and the average number of user equipments in the cluster of cells,
    a ratio of an average number of resource blocks used for communication in the cell and the average number of resource blocks in the cluster of cells, and
    a ratio of an average volume of a downlink information traffic used in the cell and the average volume of a downlink information traffic used in the cluster of cells.

15. The apparatus of claim 12, wherein a function of the optimized transmit power equals the function of the nominal power multiplied by the scaling factor.

16. The apparatus of claim 15, wherein the function of the optimized transmit power is a logarithmic function of the optimized transmit power and the function of the nominal power is the logarithmic function of the nominal power.

17. The apparatus of claim 11, wherein the calculated optimized transmit power is different for different user equipments in the cell.

18. A computer program product comprising a non-transitory computer readable medium bearing computer program code embodied herein for use with a computer, the computer program code comprising:
    code for determining, by an access node supporting a cell in a network, a scaling factor for a load of the cell relative to an average load per cell of a cluster of cells comprising the cell and a group of neighboring cells; and
    code for calculating by the access node an optimized transmit power at least in downlink in the cell using the determined scaling factor, wherein the optimized transmit power equals a nominal power or a function of the nominal power multiplied by the scaling factor.

* * * * *